United States Patent
Garbossa et al.

(10) Patent No.: US 11,159,084 B2
(45) Date of Patent: Oct. 26, 2021

(54) PROTECTION CIRCUIT WITH A CUT-OFF SWITCH FOR POWER SYSTEMS

(71) Applicant: Infineon Technologies AG, Neubiberg (DE)

(72) Inventors: Cristian Garbossa, Bressanone (IT); Enrico Orietti, Pozzonovo (IT)

(73) Assignee: Infineon Technologies AG, Neubiberg (DE)

( * ) Notice: Subject to any disclaimer, the term of this patent is extended or adjusted under 35 U.S.C. 154(b) by 377 days.

(21) Appl. No.: 16/221,158

(22) Filed: Dec. 14, 2018

(65) Prior Publication Data

US 2020/0195127 A1  Jun. 18, 2020

(51) Int. Cl.
*H02H 7/00* (2006.01)
*H02M 1/32* (2007.01)
*H02M 1/00* (2006.01)
*H02M 1/08* (2006.01)

(52) U.S. Cl.
CPC ........... *H02M 1/32* (2013.01); *H02M 1/0061* (2013.01); *H02M 1/08* (2013.01); *H02M 1/0006* (2021.05); *H02M 1/0009* (2021.05)

(58) Field of Classification Search
None
See application file for complete search history.

(56) References Cited

U.S. PATENT DOCUMENTS

| 2018/0131178 A1* | 5/2018 | Shimomura | ........... H01H 9/548 |
| 2018/0191254 A1* | 7/2018 | Feng | ........................ H02M 1/08 |
| 2018/0208237 A1* | 7/2018 | Kumagai | ............. B62D 5/0484 |

* cited by examiner

*Primary Examiner* — Stephen W Jackson
(74) *Attorney, Agent, or Firm* — Slater Matsil, LLP

(57) ABSTRACT

A method of operating a power protection system coupled between a power source and a power converter includes producing, by a controller of the power protection system, a driving signal to a cut-off switch of the power protection system to electrically couple the power source to the power converter; detecting, by the controller of the power protection system, a fault condition of the power converter while the power converter is in operation, where the detecting includes detecting, by the controller of the power protection system, that a current flowing through the cut-off switch is above a pre-determined threshold while a gate control signal from the power converter indicates an OFF state for a first current path of the power converter; and in response to detecting the fault condition, turning off, by the controller of the power protection system, the cut-off switch to isolate the power source from the power converter.

20 Claims, 10 Drawing Sheets

PROTECTION CIRCUIT WITH A CUT-OFF SWITCH FOR POWER SYSTEMS

TECHNICAL FIELD

The present invention relates generally to a protection circuit for power systems, and, in particular embodiments, a protection circuit with a cut-off switch that is coupled between a power source and a power converter.

BACKGROUND

Power converters are pervasive in many electronic applications from computers to automobiles. In some embodiments, voltages within a power converter are generated by performing a DC-DC, DC-AC, and/or AC-DC conversion by operating a switch loaded with an inductor or transformer. Examples of power converters include switched mode power supplies (SMPS) and linear regulators. An SMPS is usually more efficient than other types of power conversion systems because power conversion is performed by controlled charging and discharging of the inductor or transformer and reduces energy lost due to power dissipation across resistive voltage drops.

A SMPS usually includes at least one switch (also referred to as a power switch) and an inductor or transformer. Some specific topologies include buck converters, boost converters, and flyback converters, among others. A control circuit is commonly used to open and close the switches to charge and discharge the inductor. In some applications, the current supplied to the load and/or the voltage supplied to the load is controlled via a feedback loop. In some typologies, the switches used in the SMPS are implemented using cascode switches. Linear regulator is another class of power converter where a pass transistor is controlled (e.g., turned on and off) by a controller to provide a steady voltage to an external load.

In safety applications, such as automotive safety applications, protection against overvoltage should be provided to electronic devices connected to the power converters. Overvoltage conditions may occur due to an electrical short in, e.g., the power switches of a SMPS, or the pass transistor of a linear regulator, which electrical short could result in the high voltage of the power source (e.g., an battery) being applied to the electrical devices. Conventional overvoltage protection methods may need tens of microseconds to detect the overvoltage condition to isolate the electronic devices from the dangerous high voltage. There is a need in the art for circuits and methods that can quickly detect overvoltage conditions and protect the electronic devices from the high voltages.

SUMMARY

In accordance with an embodiment, a method of operating a power protection system coupled between a power source and a power converter includes producing, by a controller of the power protection system, a driving signal to a cut-off switch of the power protection system to electrically couple the power source to the power converter; and detecting, by the controller of the power protection system, a fault condition of the power converter while the power converter is in operation, wherein the detecting includes: receiving, by the controller of the power protection system, a first gate control signal from the power converter, the first gate control signal indicating whether a first current path of the power converter is turned on or off while the power converter is in operation; and indicating, by the controller of the power protection system, the fault condition when a first current flowing through the cut-off switch is above a first pre-determined threshold while the first gate control signal indicates an OFF state for the first current path of the power converter. The method further includes in response to detecting the fault condition, turning off, by the controller of the power protection system, the cut-off switch to isolate the power source from the power converter.

In accordance with an embodiment, a method of operating a power system that includes a power converter and a protection circuit coupled between a voltage supply and the power converter includes turning on, by a controller of the protection circuit, a cut-off switch of the protection circuit, the cut-off switch coupled between the voltage supply and an input voltage node of the power converter; starting the power converter by switching on and off power switches of the power converter; and after starting the power converter, performing a first test to detect an electrical short of a high-side power switch of the power converter, wherein performing the first test comprises: receiving, by the controller of the protection circuit, a gate control signal of the high-side power switch; and determining, by the controller of the protection circuit, that an electrical current flows through the cut-off switch when the gate control signal has a value that corresponds to an OFF state of the high-side power switch.

In accordance with an embodiment, a power protection circuit configured to be coupled between a voltage supply and a power converter includes a controller; a driver circuit configured to be coupled between the controller and a cut-off switch, wherein a first load path terminal of the cut-off switch is configured to be coupled to the voltage supply, and a second load path terminal of the cut-off switch is configured to be coupled to the power converter; a current sensing circuit configured to be coupled to the cut-off switch and to sense a current flowing through the cut-off switch; a current measurement circuit coupled between the controller and the current sensing circuit and configured to provide a first measurement of the sensed current flowing through the cut-off switch; a comparator configured to be coupled between the controller and the second load path terminal of the cut-off switch and to compare a voltage at the second load path terminal with a pre-determined voltage threshold; and a pull-down circuit configured to be coupled between the controller and the second load path terminal of the cut-off switch, wherein the controller is configured to: assert a drive signal to the cut-off switch; monitor the current through the cut-off switch based on the first measurement; detect that there is a current flowing through the cut-off switch when the power converter is activated and when a gate control signal of the power converter indicates an OFF state for a first current path of the power converter, the first current path being coupled to the second load path terminal of the cut-off switch; and upon detecting that there is a current flowing through the cut-off switch when the power converter is activated and when the gate control signal of the power converter indicates the OFF state for the first current path of the power converter, switch off the cut-off switch.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to the disclosed embodiments in a specific context, a protection circuit for a power system, and, in particular embodiments, a protection circuit with a cut-off switch coupled between a power source and a power converter.

In some embodiments, a fault condition of the power converter or a fault condition of the protection circuit is detected by performing a plausibility test. In the plausibility test, the power converter and/or the protection circuit are set up with a specific configuration so that a specific value is expected for a specific signal (e.g., a voltage signal, or a current signal). The expected value of the specific signal is then compared with a measured value of the specific signal. If there is a discrepancy between the expected value and the measured value for the specific signal then a fault condition is detected. In response to detection of the fault condition, appropriate overvoltage protection measures may be taken. For example, the cut-off switch of the protection circuit may be turned off to isolate the power converter from the power source. As another example, the switching of the power switches of the SMPS may be stopped.

Figure 1:
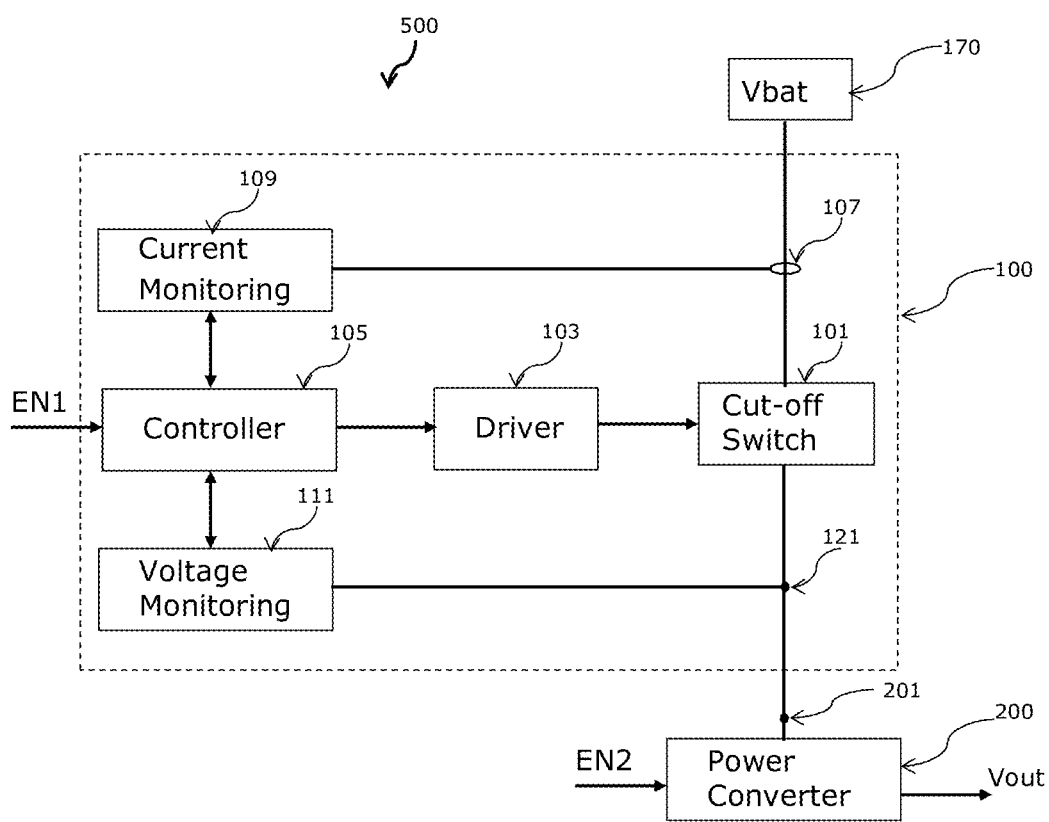
FIG. 1 illustrates a block diagram of a power system with a protection circuit, in an embodiment.

FIG. 1 is a block diagram of a power system 500 with a protection circuit 100 (also referred to a power protection system) coupled between a power source 170 and a power converter 200, in some embodiments. Note that for simplicity, not all details of the power system 500 are illustrated in FIG. 1. In the illustrated embodiment, the power source 170 may represent a voltage supply, such as a battery, with a voltage $V_{bat}$. Alternatively, power source 170 may be implemented using other devices that produce an electrical potential. The power converter 200 may be any suitable type of power converter, such as a switched mode power supply (SMPS) or a linear regulator. For example, the power converter 200 may be a buck converter, a boost converter, a flyback converter, a linear regulator, or the like. The power converter 200 may also be referred to as a regulator, or a power regulator. As illustrated in FIG. 1, an input signal EN2 to the power converter 200 enables or disables the operation of the power converter 200. The power converter 200 outputs a voltage at an output port $V_{out}$, which is connected to an external load to supply electrical power to the external load.

The protection circuit 100 includes a cut-off switch 101 electrically coupled between the power source 170 and the power converter 200. The cut-off switch 101 is a switch than can be turned on or off by a control signal, such as a control voltage from a driver 103. In some embodiments, the cut-off switch is transistor, such as an n-type lateral double-diffused metal-oxide-semiconductor (NLDMOS) transistor, a p-type lateral double-diffused metal-oxide-semiconductor (PLDMOS) transistor, or the like. In some embodiments, when the cut-off switch 101 is turned on (e.g., in the ON state), a low-impedance electrical path is formed between the source terminal and the drain terminal (which are collectively referred to as the load path terminals) of the cut-off switch 101 (e.g., a transistor), such that the power source 170 is electrically coupled to an input voltage node 201 of the power converter 200. When the cut-off switch 101 is turned off (e.g., in the OFF state), a high-impedance electrical path is formed between the load path terminals of the cut-off switch 101, such that the power source 170 is electrically isolated (e.g., disconnected) from the power converter 200.

In some embodiments, the cut-off switch 101 is turned on during normal operation of the power system 500 such that the power source 170 is electrically coupled to the power converter 200, and when a fault condition is detected, the cut-off switch 101 is turned off to isolate the power source 170 from the power converter 200, thereby reducing or preventing damage related with, e.g., overvoltage conditions, details of which are discussed hereinafter.

As illustrated in FIG. 1, the driver 103 is coupled between the cut-off switch 101 and a controller 105. The driver 103 accepts a gate control signal from the controller 105, and converts the gate control signal into a gate voltage with appropriate voltage level and driving capability to turn on or off the cut-off switch 101, in some embodiments. The gate voltage from the driver 103 is electrically coupled to a gate (see FIG. 2A) of the cut-off switch 101, in the illustrated embodiments.

The controller 105 may be a micro-controller, a digital signal processor (DSP), or the like, and may have memory circuits (e.g., non-volatile memories) that can be programmed such that the controller 105 can execute the program (e.g., computer code) stored in the memory circuits. Alternatively, or in addition, the controller 105 may include digital logic circuits that perform logic decisions/operations based on input signals to the controller 105, such as the logic decisions/operations discussed hereinafter with reference to FIGS. 5-8. An enable signal EN1 enables or disables the operation of the controller 105, as illustrated in FIG. 1.

Still referring to FIG. 1, the protection circuit 100 includes a current sensing circuit 107 for sensing (e.g., measuring) the current flowing through the cut-off switch 101 (e.g., from the power source 170 toward the power converter 200). The current sensing circuit 107 may be implemented as a current mirror, as an example. As another example, the current sensing circuit 107 may be implemented as a shunt resistor connected to the source terminal or to the drain terminal of the cut-off switch 101, in which case the voltage drop across the shunt resistor indicates (e.g., is proportional to) the value of the current flowing through the cut-off switch 101. Therefore, the current sensing circuit 107 outputs a value that is proportional to the current flowing through the cut-off switch 101, in the illustrated embodiment.

A current monitoring circuit 109, also referred to as a current measurement circuit, is electrically coupled between the current sensing circuit 107 and the controller 105. The current monitoring circuit 109 measures the output of the current sensing circuit 107 and sends the measured current value to the controller 105, in some embodiments. The current monitoring circuit 109 may also compare the measured current value with a pre-determined current threshold, and send a logic value (e.g., logic high or logic low) to the controller 105 to indicate whether the measured current value is above or below the pre-determined current threshold.

FIG. 1 further illustrates a voltage monitoring circuit 111 electrically coupled between the controller 105 and a node 121 that is electrically coupled (e.g., directly or conductively connected) to a load path terminal of the cut-off switch 101 and to the input voltage node 201 of the power converter 200. As illustrated in FIG. 1, the node 121 is disposed between the cut-off switch 101 and the power converter 200. The voltage monitoring circuit 111 measures the voltage at the node 121 and sends the measured voltage value to the controller 105. The voltage monitoring circuit 111 may also compare the measured voltage value with a pre-determined voltage threshold, and send a logic value (e.g., logic high or logic low) to the controller 105 to indicate whether the measured voltage value is above or below the pre-determined voltage threshold.

Figure 2A:
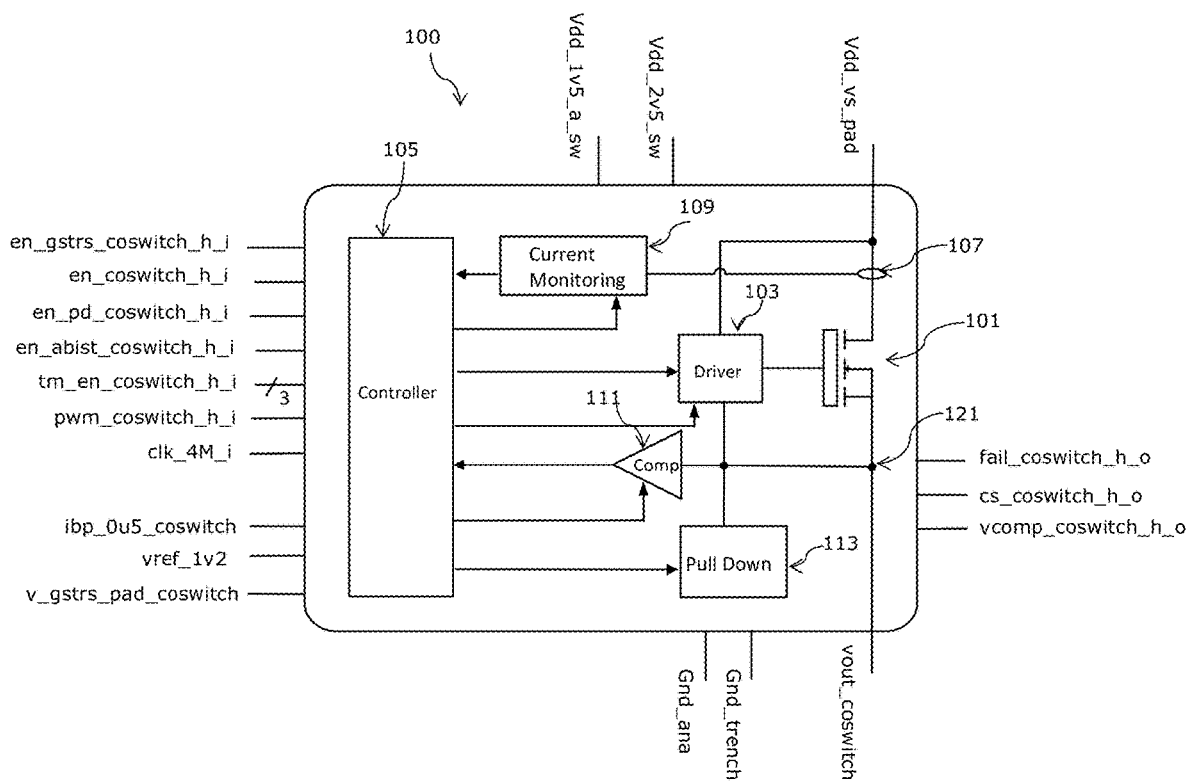
FIG. 2A illustrates a block diagram of a protection circuit, in an embodiment.

FIG. 2A shows a block diagram of the protection circuit 100 of FIG. 1, according to an embodiment. In FIG. 2A, the cut-off switch 101 is implemented as a transistor, such as an NLDMOS transistor. Driver 103 may be implemented using any suitable driver circuit known in the art. In some embodiments, driver 103 may include a charge pump circuit. In FIG. 2A, the voltage monitoring circuit 111 is illustrated as a voltage comparator coupled between the node 121 and the controller 105, thus may also be referred to as a voltage comparator 111 hereinafter. FIG. 2A further illustrates a pull down circuit 113 coupled between the node 121 and the controller 105. In the illustrated embodiment, the pull down circuit 113 is configured to draw current from node 121, and may be implemented using, for example, a current source circuit, a transistor or a switchable resistive circuit. The pull down circuit 113 may be a weak pull down circuit and may have a limited driving capability (e.g., between a few milliampere (mA) to tens of mAs). The pull down circuit 113, the voltage comparator 111, the current monitoring circuit 109, and the current sensing circuit 107 are used to detect fault conditions of the power system 500, as described in details hereinafter.

FIG. 2A further illustrates various input signals (e.g., clock signals, enable signals) on the left side of the block diagram and various output signals (e.g., status signals) on the right side of the block diagram. In addition, input voltage signals and reference signals (e.g., electrical ground signals) are illustrated at the top and at the bottom of the block diagram, respectively. In some embodiments, the protection circuit 100 is implemented as an integrated circuit (IC) formed monolithically on a semiconductor substrate, although the protection circuit 100 may also be implemented using discrete components.

Figure 2B:
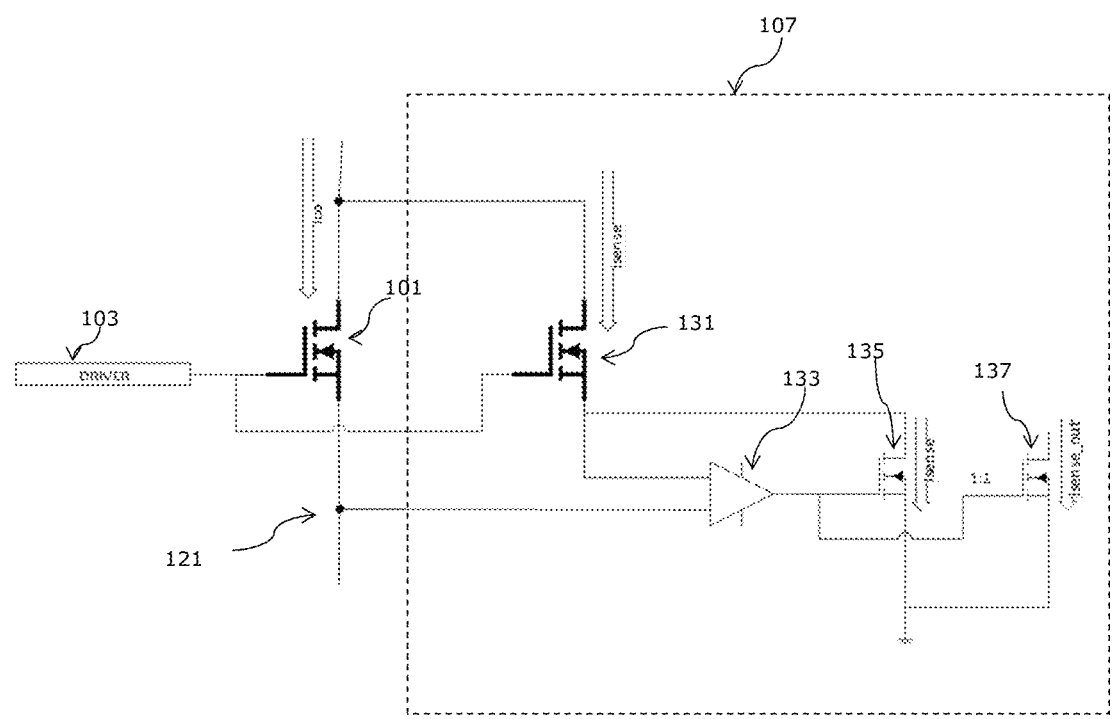
FIG. 2B illustrates a current sensing circuit, in an embodiment.

FIG. 2B illustrates a schematic of the current sensing circuit 107, in some embodiments. To facilitate discussion, the driver 103 and the cut-off switch 101, which are not part of the current sensing circuit 107, are also illustrated in FIG. 2B. In other words, the current sensing circuit 107 includes components within the dashed box in FIG. 2B.

The current sensing circuit 107 of FIG. 2B functions as a current mirror and includes a transistor 131 (e.g., a MOS transistor) that is matched to the cut-off switch 101 (e.g., a MOS transistor) with a large ratio between the size of the cut-off switch 101 and the size of the transistor 131. For example, the size of the cut-off switch 101 may be 100 times larger than transistor 131. For the current mirror circuit of FIG. 2B, the relationship between the current $I_{co}$ (which flows through the load path terminals of the cut-off switch 101) and the current $I_{sense}$ (which flows through the load path terminals of the transistor 131) is described by $I_{sense}=I_{co} \times S_{131}/S_{101}$, where $S_{133}$ and $S_{101}$ denote the size of the transistor 131 and the size of the cut-off switch 101 (e.g., a transistor), respectively. Therefore, for the example above, $I_{sense}$ may be $1/1000$ of $I_{co}$, or even smaller.

In addition, the current sensing circuit 107 of FIG. 2B includes an error amplifier 133, which is used to maintain the sources (e.g., source terminals) of the cut-off switch 101 and the transistor 131 at a same voltage level, for closing the loop, and for ensuring the above described relation between $I_{co}$ and $I_{sense}$. FIG. 2B further illustrates two transistors 135 and 137 (e.g., MOS transistors) that are driven by the error amplifier 133. The current $I_{sense}$ flows through the transistor 135. The drain of transistor 137 through which current $I_{sense}$ out flows forms the output of the current sensing circuit 107. In some embodiments, the ratio (e.g., size ratio) between the transistors 135 and 137 is 1:1, and therefore, $I_{sense\_out}$ is equal to $I_{sense}$. In other embodiments, the ratio between the transistors 135 and 137 is adjusted to a value other than 1, such that $I_{sense\_out}$ is proportional to (e.g., a fraction of, or a multiple of) $I_{sense}$. The current sensing circuit 107 illustrated in FIG. 2B is a non-limiting example. Other configurations or structures for the current sensing circuit 107 are possible and are fully intended to be included within the scope of the present disclosure.

Figure 3:
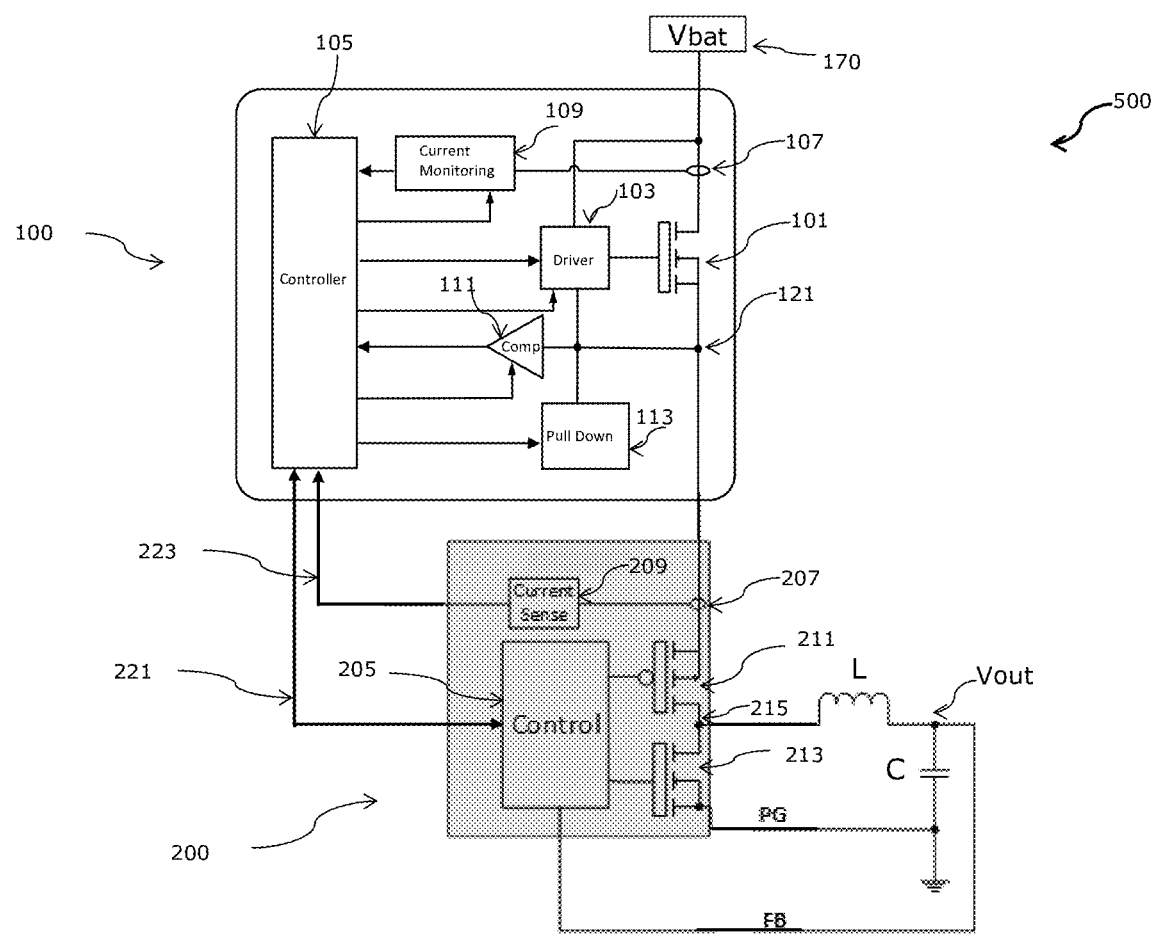
FIG. 3 illustrates a power system comprising a protection circuit and a switched mode power supply (SMPS), in an embodiment.

FIG. 3 illustrates an embodiment of the power system 500 of FIG. 1, where the protection circuit 100 is the same as the protection circuit 100 of FIG. 2A, and the power converter 200 is a switched mode power supply (SMPS), such as a Buck converter. As illustrated in FIG. 3, the power converter 200 includes two power switches, such as a high-side power switch 211 and a low-side power switch 213 that are coupled to a controller 205. During normal operation of the SMPS, the controller 205 switches the high-side power switch 211 and the low-side power switch 213 on and off alternately. The high-side power switch 211 may also be referred to as a first current path of the power converter 200, and when the high-side power switch 211 is turned on (or turned off), the first current path is said to be in an ON state (or in an OFF state).

The power converter 200 in FIG. 3 also includes an inductor L coupled between a node 215 (may also be referred to as a switching node of the power converter 200) and an output port $V_{out}$. Power converter 200 also includes a capacitor C coupled between the output port $V_{out}$ and a reference voltage node (e.g., electrical ground). In addition, the power converter 200 of FIG. 3 includes a current sensing circuit 207, which may be the same or similar to the current sensing circuit 107, and includes a current monitoring circuit 209 for measuring and/or for comparing the measured current value with a pre-determined threshold.

As illustrated in FIG. 3, the controller 205 of the power converter 200 is coupled to the controller 105 of the protection circuit 100, e.g., through signal path 221. In addition, the output of the current monitoring circuit 209 of the power converter 200 is sent to the controller 105 of the protection circuit 100, e.g., through signal path 223. The communication between the power converter 200 and the protection circuit 100 allows for detection of various fault conditions of the power system 500, as described hereinafter.

Figure 4:
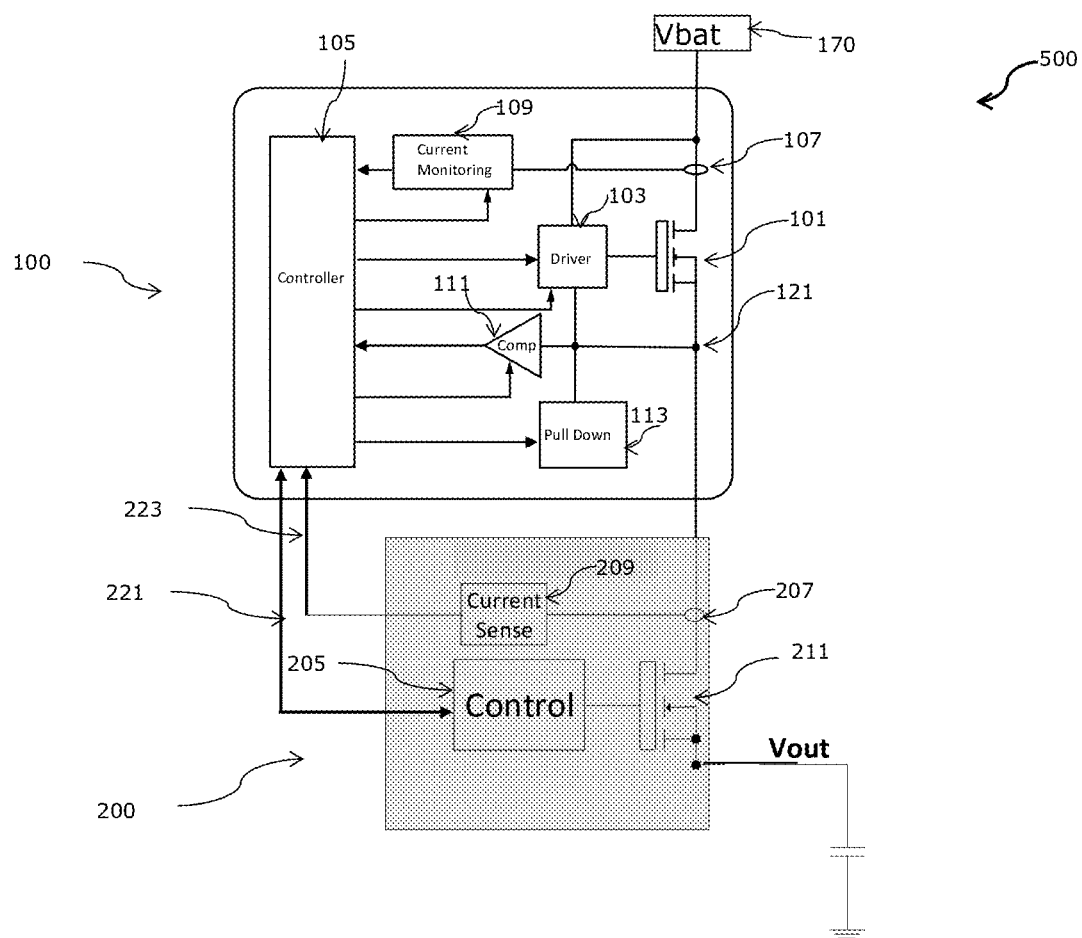
FIG. 4 illustrates a power system comprising a protection circuit and a linear regulator, in an embodiment.

FIG. 4 illustrates an embodiment of the power system 500 of FIG. 1, where the protection circuit 100 is the same as the protection circuit 100 of FIG. 2A, and the power converter 200 is a linear regulator with a pass transistor 211. The pass transistor 211 of the linear regulator in FIG. 4 may also be referred to as a first current path of the linear regulator, and when the pass transistor 211 is turned on (or turned off), the first current path is said to be in an ON state (or in an OFF state). For simplicity, not all of the details of the linear converter are illustrated in FIG. 4.

The power converter 200 of FIG. 4 further includes a current sensing circuit 207, a current monitoring circuit 209, and a controller 205, similar to the power converter 200 of FIG. 3. In addition, the controller 205 and the current monitoring circuit 209 are coupled to the controller 105 through signal path 221 and signal path 223, respectively. Discussion hereinafter regarding detection of various fault conditions may use the power system 500 in FIG. 3 as examples (e.g., may refer to the high-side power switch 211 and the low-side power switch 213 of the power converter 200), with the understanding that the principle of the present disclosure may be applied to other power systems with other types of power converters, such as the power system 500 in FIG. 4 with a linear regulator.

In various applications for the power system 500, the power source 170 is a battery with a high voltage of, e.g., 12 V, 40 V, or even higher. The power converter 200 down-converts the high voltage and generates an output voltage, such as 3.3 V, or 5V, at the output port $V_{out}$. The lower output voltage is then used to supply electrical power to electrical devices with lower voltage ratings (e.g., 3.3V, 5V). During operation of the power system 500, if there is a fault condition, such as an electrical short of the power switch (see, e.g., 211 in FIG. 3), the high voltage (e.g., 12V, 40V) of the power source 170 may be directly applied to the electrical devices with lower voltage ratings (e.g., 3.3V, 5V), thereby causing an overvoltage condition that may damage the electrical devices. To detect the overvoltage condition, the voltage at the output port $V_{out}$ may be measured and monitored. However, such a detection method may not be fast enough to prevent damage to the electrical devices, because the detection works when the high voltage is already at the output port $V_{out}$ (thus already applied to the electrical devices). In addition, to prevent false detection, the measured voltage may need to be further processed (e.g., filtered to filter out random spurs in the measured voltage). Therefore, such a detection method may have a detection time that is about 1 cycle of the pulse width modulation (PWM) control signal of the power converters 200, and may be in the order of microseconds or tens of microseconds. In contrast, the protection circuit 100 and the detection methods disclosed in the present disclosure achieve a much faster overvoltage detection, e.g., within about 1 cycle of the clock signal for the controller 105 of the protection circuit 100, such as less than 200 ns or less than 100 ns. The faster detection time is advantageous in that it may help better protect electrical devices in the low voltage domain.

Figure 5:
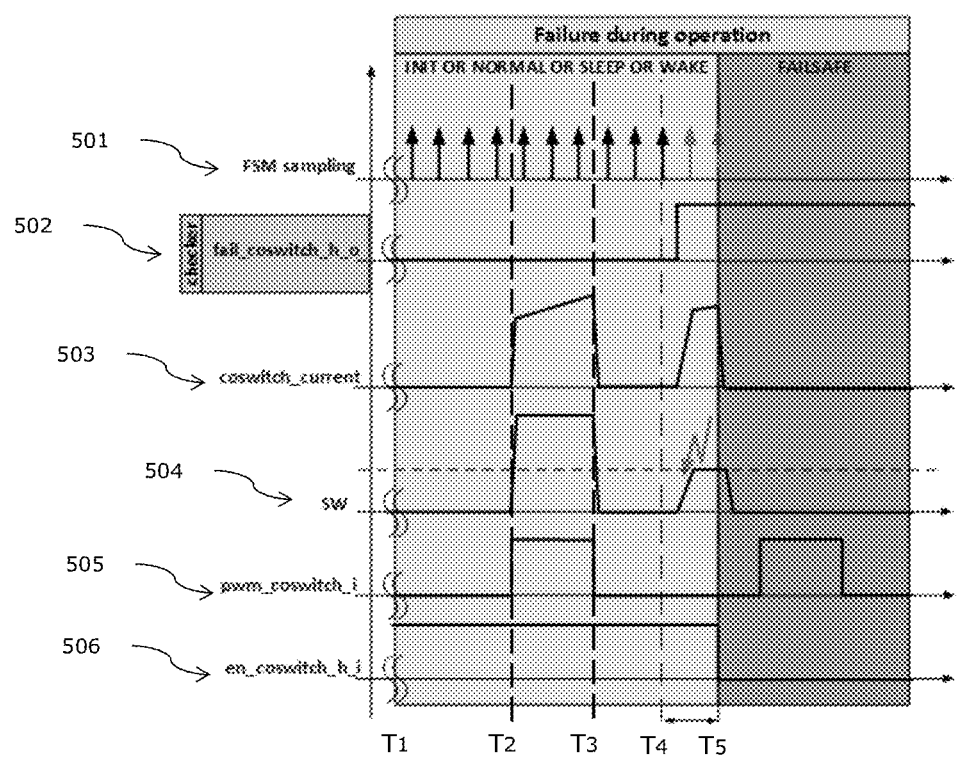
FIG. 5 illustrates a timing diagram of a method for detection of a fault condition during operation of a power system, in an embodiment.

FIG. 5 illustrates a timing diagram of a method for detection of a fault condition during operation of the power system 500 of FIG. 3, in an embodiment. In particular, FIG. 5 shows the detection of a fault condition when the high-side power switch 211 (see FIG. 3) has an electrical short. Note that when the power system 500 is in normal operation, the cut-off switch 101 is turned on, and the power converter 200 switches the high-side power switches 211 and the low-side power switch 213 on and off alternately. In FIGS. 5-8, time lables T1, T2, T3, T4 and T5 are used to denote different time instants within the figure. The same time lable in one figure may not necessarily correspond to the same time label in a different figure.

In FIG. 5, signal 501 (labeled as "FSM sampling") is the clock signal for the controller 105, which may be, e.g., 10 times faster than the PWM control signal of the power converter 200. Signal 502 (labeled as "fail_coswitch_h_o") is an output signal, which when asserted (e.g., having a logic high value), indicates detection of the fault condition. Signal 503 (labeled as "coswitch_current") illustrates the measured value of the electrical current flowing through the load path terminals of the cut-off switch 101, which is provided by the current monitoring circuit 109. Signal 504 (labeled as "SW") illustrates the voltage at the node 215 of the power converter 200. Signal 505 (labeled as "pwm_coswitch_i") is a control signal (e.g., a PWM control signal) from the controller 205 of the power converter 200 to turn on and off the high-side power switch 211. For example, a logic high value of the signal 505 indicates that the controller 205 sends a gate control signal to turn on the high-side power switch 211, and a logic low value of the signal 505 indicates that the controller 205 sends a gate control signal to turn off the high-side power switch 211. Signal 506 (labeled as "en_co-switch_h_i") is an enable signal from the controller 105 that, when asserted, causes the driver 103 to turn on the cut-off switch 101.

FIG. 5 represents the behavior of power system 500 during normal operation (e.g., without fault condition) from time T1 to time T4 when cut-off switch 101 is turned on, and the power converter 200 switches the high-side power switch 211 and the low-side power switch 213 on and off alternately. Note that FIG. 5 only shows the switching signal for the high-side power switch 211, and the switching signal for the low-side power switch 213 is not illustrated in FIG. 5. For example, the high-side power switch 211 is turned on between time T2 and time T3, and then turned off after time $T_3$.

At time T4, the high-side power switch 211 has an electrical short which results in an electrical current flowing from the power source 17o, through the cut-off switch 101, through the (shorted) high-side power switch 211, and to the electrical ground, as indicated by the rising current value of signal 503 between time T4 and time T5. Note that between time $T_4$ and time T5, the signal 505 has a logic low value, which indicates that the controller 205 sends a gate control signal to turn off the high-side power switch 211. If the high-side power switch 211 is indeed turned off, the power converter 200 is not drawing current from the power source 17o, and there should be no current flowing through the cut-off switch 101. However, due to the electrical short, a low-impedance electrical path exists between the power source 170 and the electrical ground, and accordingly, an unexpected electrical current flows through the cut-off switch 101.

Therefore, as discussed above, the existence of an electrical current flowing through the cut-off switch 101 when no such electrical current is expected can be used by the controller 105 to detect the fault condition (e.g., electrical short) of the high-side power switch 211. In other words, during normal operation of the power system 500, if the current monitoring circuit 109 detects that the current flowing through the cut-off switch 101 is above a pre-determined current threshold while the signal 505 indicates that the high-side power switch 211 is in an OFF state, the controller 105 of the protection circuit 100 should declare detection of a fault condition (e.g., electrical short of the high-side power switch 211). Note that the pre-determined current threshold is used by the current monitoring circuit 109 to detect the existence of a current flowing through the cut-off switch 101, and therefore, the pre-determined current threshold does not need to be implemented with a tight tolerance. Instead, the pre-determined current threshold may be any suitable value, such as 100 mA, to distinguish from the scenario where there is no current flowing through the cut-off switch 101.

As illustrated in FIG. 5, the signal 502 is asserted within a cycle of the clock signal of the controller 105 to indicate detection of the fault condition, and the signal 506 is de-asserted by the controller 105 to turn off the cut-off switch 101, thereby isolating the power source 170 from the power converter 200 to prevent damage due to overvoltage.

As mentioned before, although the fault detection method illustrated in FIG. 5 is discussed with reference to the power system 500 of FIG. 3 as an example, the fault condition detection method illustrated in FIG. 5 may also be used for the power system 500 of FIG. 4 to detect the electrical short of the pass transistor 211.

The protection circuit 100 and the detection method discussed above with reference to FIG. 5 achieves fault condition detection within one cycle of the clock signal of the controller 105, which may be less than about 100 ns. As a result, the cut-off switch 101 is turned off quickly to achieve overvoltage protection, before the current flowing through the cut-off switch 101 increases from a few amperes (in normal operation without fault condition) to a large value (e.g., over ten amperes). The quick fault condition detection afforded by the presently disclosed method prevents the inductor of the power converter 200 from being charged up and overstressing the external load, and effectively prevents or reduces damages due to overvoltage conditions.

Figure 6:
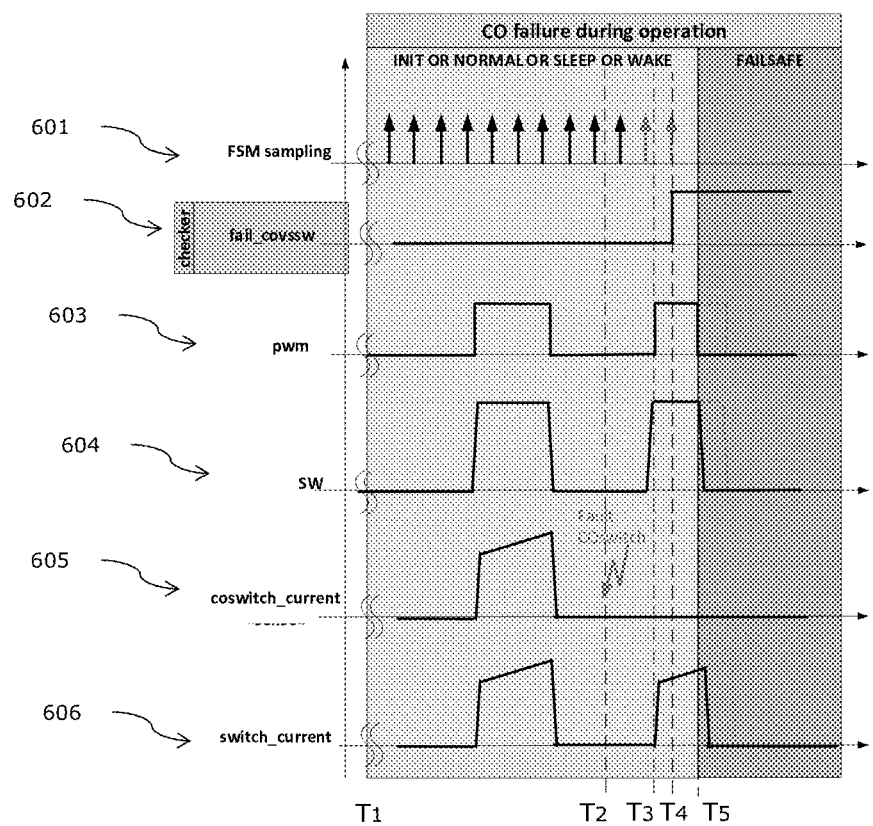
FIG. 6 illustrates a timing diagram of a method for detection of a fault condition during operation of a power system, in another embodiment.

FIG. 6 illustrates a timing diagram of a method for detection of a fault condition (e.g., electrical short of the cut-off switch 101) during operation of the power system 500 (e.g., the power system 500 in FIG. 3 or in FIG. 4), in an embodiment. The detection method shown in FIG. 6 uses the outputs of the current monitoring circuit 109 of the protection circuit 100 and the current monitoring circuit 209 of the power converter 200. In addition, the detection method assumes that the current sensing circuit 107 of the protection circuit 100 and the current sensing circuit 207 of the power converter 200 perform the current sensing through power split (e.g., using a current mirror such as the current sensing circuit 107 of FIG. 2B) instead of through a shunt resistor.

In FIG. 6, signal 601 is the clock signal of the controller 105 FIG. 5, signal 602 is an output signal from the controller 105, which when asserted, indicates the detection of the fault condition. Signal 603 is a control signal from the controller 205 indicating whether the high-side power switch 211 in FIG. 3 or the pass transistor 211 in FIG. 4 is switched on or off, same as signal 505 in FIG. 5. Signal 604 is the same as signal 504 of FIG. 5. Signal 605 is the measured value of the electrical current flowing through the load path terminals of the cut-off switch 101, same as signal 503 of FIG. 5. Signal 606 is the measured value for the electrical current flowing through the load path terminals of the high-side power switch 211 in FIG. 3 or the pass transistor 211 in FIG. 4. To facilitate discussion, the high-side power switch 211 in FIG. 3 or the pass transistor 211 in FIG. 4 may be simply referred to as a transistor 211 hereinafter.

Referring to FIG. 6, from time T1 to time T2, there is no fault condition, and the power system 500 functions normally. For example, from time T1 to time T2, during the time interval when the transistor 211 is turned on, electrical current flows through the cut-off switch 101 and the transistor 211, as indicated by the current pulses in signal 605 and signal 606, and when the transistor 211 is turned off, no current flows through the cut-off switch 101. At time T2, the cut-off switch 101 has an electrical short. At time T3, the transistor 211 is turned on again, as indicated by the rising edge of signal 603 at time T3. As a result, an electrical current flows from the power source 17o, through the (electrically shorted) cut-off switch 101, and through the transistor 211, and therefore, a current is measured by the current monitoring circuit 209, as indicated by the increasing current value of signal 606 between time T3 and time T4.

If the cut-off switch 101 were not electrically shorted, the current monitoring circuit 109 would be able to measure and detect an electrical current flow through the cut-off switch 101. However, due to the electrical short of the cut-off switch 101, the current sensing circuit 107 is effectively shorted by the (electrically shorted) cut-off switch 101, and therefore, no current flows through the current sensing circuit 107. As a result, no current is measured or detected by the current monitoring circuit 109, as indicated by the low (e.g., zero) current value of signal 605 from time T3 to time T4. In other words, while an electrical current is expected to be measured or detected by the current monitoring circuit 109, no electrical current is measured or detected due to the electrical short of the cut-off switch 101. This discrepancy may be used by the controller 105 in a plausibility test to detect the fault condition. In particular, the controller 105 receives a first output from the current monitoring circuit 109 of the protection circuit 100 and a second output from the current monitoring circuit 209 of the power converter 200. If an electrical current flowing through the transistor 211 is detected (e.g., the second output is larger than a second pre-determined threshold) and an electrical current flowing through the cut-off switch 101 is not detected (e.g., the first output is smaller than a first pre-determined threshold), the controller 105 determines that the cut-off switch 101 has a fault condition (e.g., electrical short).

As illustrated in FIG. 6, at time T4, the signal 602 is asserted by the controller 105 to indicate that a fault condition has been detected. The controller 105 may also instruct the power converter 200 to stop switching. At time T5, the power converter 200 stops switching.

Note that the method illustrated in FIG. 6 may be modified to detect an electrical short of the transistor 211 during operation of the power system 500. In particular, the waveforms for signals 605 and 606 are switched for the modified fault detection method, with other signals in FIG. 6 remaining unchanged. Accordingly, the modified method for fault condition detection may be described as follows. The controller 105 receives a first output from the current monitoring circuit 109 of the protection circuit 100 and a second output from the current monitoring circuit 209 of the power converter 200. If an electrical current flowing through the cut-off switch 101 is detected (e.g., the first output is larger than a first pre-determined threshold) and an electrical current flowing through the transistor 211 is not detected (e.g., the second output is smaller than a second pre-determined threshold), the controller 105 determines that the transistor 211 has a fault condition (e.g., electrical short).

Figure 7:
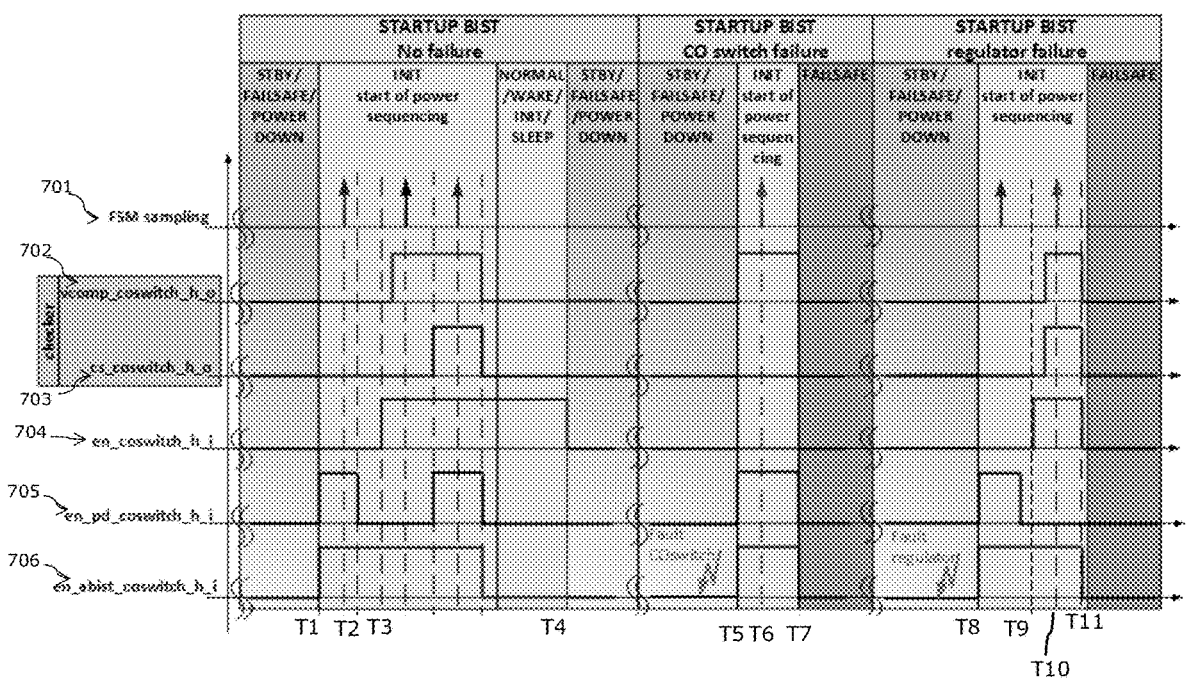
FIG. 7 illustrates timing diagrams of methods for detection of device failures during a self-test of the power system, in an embodiment.

FIG. 7 illustrates timing diagrams of methods for detecting device failures during a self-test of the power system, in an embodiment. The self-test is used to test and identify fault conditions in the protection circuit 100 or the power converter 200, and is performed before the power system 500 starts normal operation in the illustrated embodiment. In other words, when the self-test is being performed, the power converter 200 is not switching (e.g., the high-side power switches 211 and the low-side power switches 213 stay in the OFF state).

In FIG. 7, signal 701 is the clock signal of the controller 105 of the protection circuit 100. Signal 702 is the output signal of the voltage comparator 111 of the protection circuit 100. A logic high value for signal 702 indicates that the voltage at the node 121 (see, e.g., FIG. 3) is higher than a pre-determined threshold, and vice versa. The pre-determined threshold for the voltage comparator 111 does not have to be accurate, and may be, e.g., a suitable value between zero and the voltage of the power source 170. Signal 703 is the output of the current monitoring circuit 109 of the protection circuit 100. In the example of FIG. 7, a logic high value for signal 703 indicates that the current flowing through the cut-off switch 101 is above a pre-determined threshold (e.g., about 100 mA), and vice versa. Signal 704 is an enable signal from the controller 105 for turning on and off the cut-off switch 101 (e.g., a logic high value is used for turning on the cut-off switch 101). Signal 705 is an enable signal from the controller 105 for turning on the pull down circuit 113, which is turned off in normal operation and is only turned on in self-test mode (e.g., when signal 705 has a logic high value). Signal 706 is an enable signal (e.g., from the controller 105), which when asserted, enables the self-test mode.

In FIG. 7, the waveforms from time T1 to T4 illustrate the expected waveforms during a self-test when no fault condition exists in the power system 500. These waveforms will serve as a baseline for comparison with the waveforms from time T5 to time T7, and for comparison with the waveforms from time T8 to time T11, when there is a fault condition. In particular, the waveforms from time T5 to time T7 correspond to a fault condition where the cut-off switch 101 has an electrical short, and the waveforms from time T9 to time T11 correspond to a fault condition where the high-side power switch 211 has an electrical short.

The method for detecting the above described fault conditions are described hereinafter. Referring to FIG. 7, sometime before time T5, the cut-off switch 101 has a fault condition (e.g., an electrical short). At time T5, signal 706 turns high, which enables the self-test mode, and signal 705 turns high, which turns on the pull down circuit 113. Note that signal 704 is low at time T5, which indicates that the cut-off switch 101 should be in an OFF state. Since the power switches (e.g., 211, 213) of the power converter 200 are turned off in self-test mode, the node 121 (see FIG. 3) is isolated from the power source 170 and the power converter 200. Therefore, no high voltage is expected at the node 121. However, due to the electrical short of the cut-off switch 101, the voltage at the node 121 is substantially the same as the voltage of the power source 170, which has a high voltage (e.g., 12V, or 40V). As a result, the output of the voltage comparator 111 turns high, as indicated by signal 702 from time T5 to time T7. The controller 105 detects this unexpected high voltage at the node 121 by detecting the logic high value of signal 702 at time T6, and declares a fault condition of the cut-off switch 101. Accordingly, the controller 105 may assert an error signal to indicate the fault condition, and may stop the operation of the power system 500.

Still referring to FIG. 7, a method to detect an electrical short of the high-side power switch 211 is described using the waveforms between time T8 and time T11. Note that the first segment of waveforms between time T5 and time T7 and the second segment of waveforms between time T8 and time T11 are independent from each other. In other words, the detection of the two fault conditions are independent from each other.

The detection method assumes that sometime before time T8, the high-side power switch 211 has an electrical short. At time T8, signal 706 turns high and put the power system 500 into self-test mode. At time T9, signal 705 is low such that the pull down circuit 113 is turned off, and signal 704 turns high to turn on the cut-off switch 101. Due to the cut-off switch 101 being turned on, the node 121 has a high voltage (e.g., same as the voltage of the power source 170), which causes the output of the voltage comparator 111 to be high, as indicated by signal 702. Since the power converter 200 is turned-off during the self-test mode, no current is expected to flow through the cut-off switch 101. However, due to the electrical short of the high-side power switch 211, an unexpected electrical current flows from the power source 170, through the cut-off switch 101 and the (shorted) high-side power switch 211 toward the external load. As a result, the output of the current monitoring circuit 109 turns high, as indicated by signal 703. The controller 105 detects the unexpected current by detecting the logic high value of signal 703 at time T10, and declares that a fault condition (e.g., electrical short) of the high-side power switches 211 is detected. The controller 105 may assert an error signal to indicate the fault condition, and may stop the operation of the power system 500 to prevent damage to the power system 500.

Figure 8:
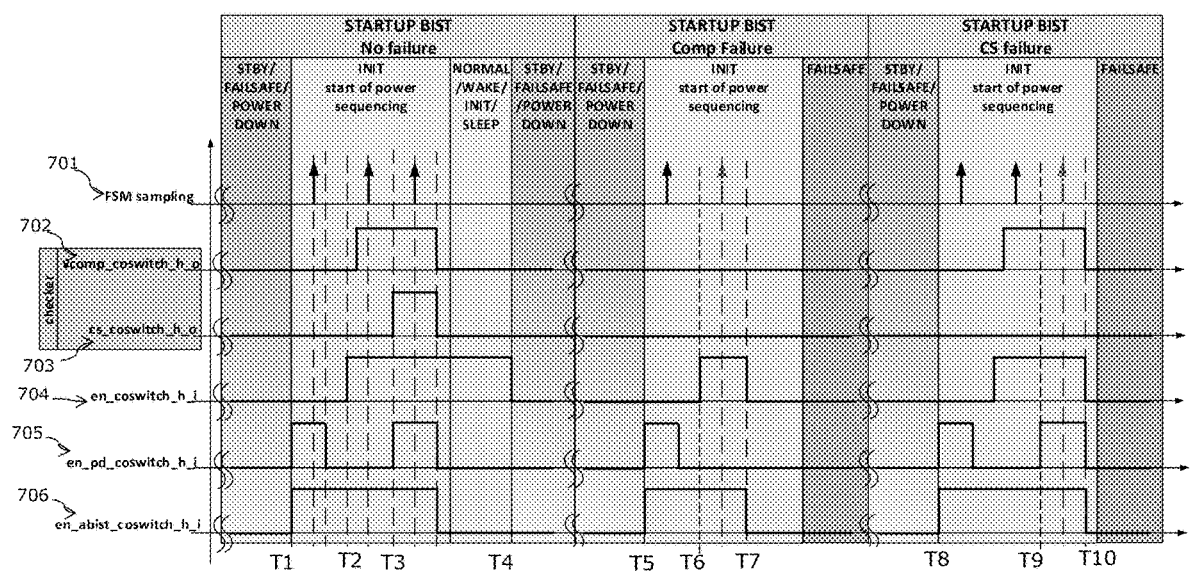
FIG. 8 illustrates timing diagrams of methods for detection of device failures during a self-test of the power system, in another embodiment.

FIG. 8 illustrates timing diagrams of additional methods for detection of device failures during a self-test of the power system 500, in an embodiment. The signals illustrated in FIG. 8 are the same as those in FIG. 7, and the waveforms between time T1 and time T4 are the same as those in FIG. 7.

The waveforms illustrated between time T5 and time T7 in FIG. 8 may be used to detect a failure of the voltage comparator 111. Referring to FIG. 8, at time T5, signal 706 turns high to put the power system 500 into self-test mode. At time T6, the pull down circuit 113 is already turned off and the cut-off switch 101 is turned on. Since the cut-off switch 101 is now in the ON state, the voltage at the node 121 is a high voltage (e.g., the voltage of the power source 170), and therefore, the output of the voltage comparator 111 should be high indicating that the voltage at the node 121 is above a pre-determined threshold. However, due to device failure of the comparator 111, the comparator 111 is not functioning properly, and therefore, still has a logic low output indicating that the voltage at the node 121 is below the pre-determined threshold, as indicated by the logic low value of signal 702 between time T6 and time T7. The controller 105 detects the failure of the voltage comparator 111 by detecting the unexpected logic low value of signal 702. The controller 105 may assert an error signal to indicate the fault condition, and may stop the operation of the power system 500 to prevent damage to the power system 500.

The waveforms illustrated between time T8 and time T10 in FIG. 8 may be used to detect a failure of the current monitoring circuit 109. Referring to FIG. 8, at time T8, signal 706 turns high to put the power system 500 into self-test mode. At time T9, the pull down circuit 113 is turned on, and the cut-off switch 101 is already on. In the illustrated embodiment, the pull down circuit 113 is a current source and is able to sink current from the node 121, and therefore, an electrical current flows through the cut-off switch 101 toward the pull down circuit 113. As a result, the current monitoring circuit 109 would normally output a logic high value indicating that the measured current value is above a pre-determined threshold. However, due to the device failure of the current monitoring circuit 109, the output of the current monitoring circuit 109 is low indicating that the measured current value is below the pre-determined threshold, as indicated by the logic low value of signal 703 between time T9 and time T10. The controller 105 detects this fault condition by detecting the unexpected logic low value of signal 703. The controller 105 may assert an error signal to indicate the fault condition, and may stop the operation of the power system 500 to prevent damage to the power system 500. Noted that the above two fault condition detection methods illustrated in FIG. 8 assume that the cut-off switching 101 is functioning properly. If the cut-off switching 101 has a device failure and is stuck in the OFF state permanently, the waveforms from time T5 to time T7 and from time T8 to time T10 will be observed.

Figure 9:
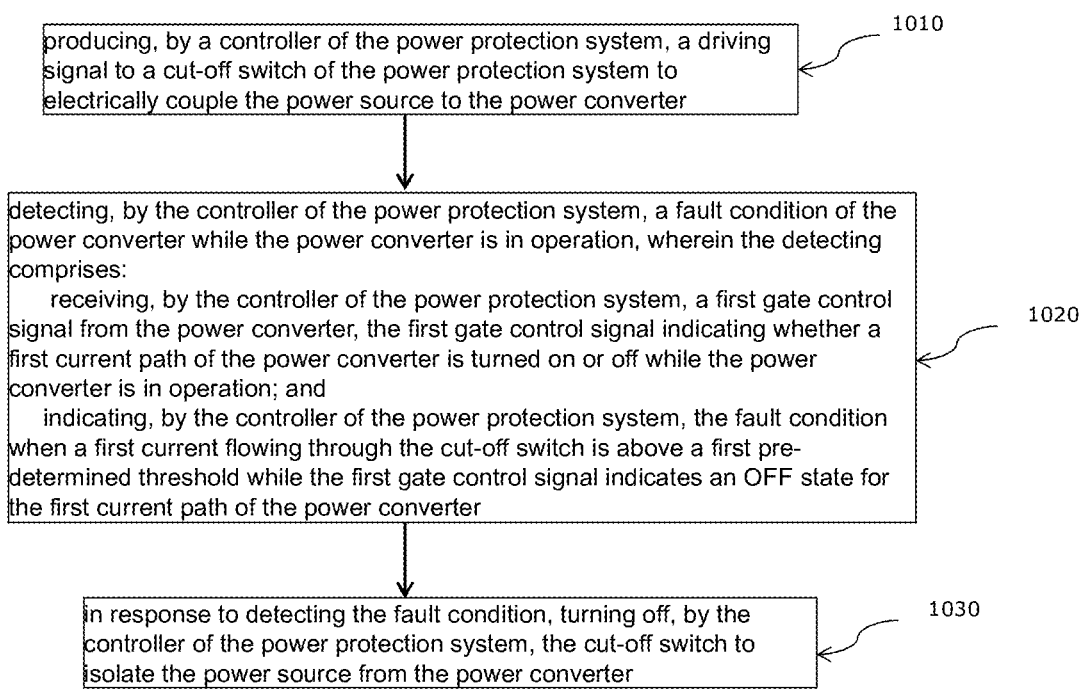
FIG. 9 illustrates a flow diagram of a method for operating a power protection system coupled between a power source and a power converter, in an embodiment.

FIG. 9 illustrates a flow chart of a method 100 of operating a power protection system coupled between a power source and a power converter, in accordance with some embodiments. It should be understood that the embodiment method shown in FIG. 9 is merely an example of many possible embodiment methods. One of ordinary skill in the art would recognize many variations, alternatives, and modifications. For example, various steps as illustrated in FIG. 9 may be added, removed, replaced, rearranged and repeated.

Referring to FIG. 9, at step 1010, a controller of the power protection system produces a driving signal to a cut-off switch of the power protection system to electrically couple the power source to the power converter. At step 1020, the controller of the power protection system detects a fault condition of the power converter while the power converter is in operation, wherein the detecting comprises: receiving, by the controller of the power protection system, a first gate control signal from the power converter, the first gate control signal indicating whether a first current path of the power converter is turned on or off while the power converter is in operation; and indicating, by the controller of the power protection system, the fault condition when a first current flowing through the cut-off switch is above a first pre-determined threshold while the first gate control signal indicates an OFF state for the first current path of the power converter. At step 103o, in response to detecting the fault condition, the controller of the power protection system turns off the cut-off switch to isolate the power source from the power converter.

The disclosed embodiments achieve many advantages. The disclosed circuits and methods can detect fault conditions in a very short period of time, such as within 1 cycle of the clock signal of the controller 105. The disclosed methods can detect over-voltage conditions before dangerous high voltages appear at the output of the power converter, thus reducing or preventing damages due to overvoltage conditions. In addition, the methods for detecting fault conditions in self-test mode provide various ways to check the functionalities of various components of the power system 500. If a device failure is detected, the power system may be turned off after self-test, before the power converter is turned on. This provides additional layers of protection to the power system.

Example embodiments of the present invention are summarized here. Other embodiments can also be understood from the entirety of the specification and the claims filed herein.

Example 1

In an embodiment, a method of operating a power protection system coupled between a power source and a power converter includes producing, by a controller of the power protection system, a driving signal to a cut-off switch of the power protection system to electrically couple the power source to the power converter; and detecting, by the controller of the power protection system, a fault condition of the power converter while the power converter is in operation, wherein the detecting includes: receiving, by the controller of the power protection system, a first gate control signal from the power converter, the first gate control signal indicating whether a first current path of the power converter is turned on or off while the power converter is in operation; and indicating, by the controller of the power protection system, the fault condition when a first current flowing through the cut-off switch is above a first pre-determined threshold while the first gate control signal indicates an OFF state for the first current path of the power converter. The method further includes in response to detecting the fault condition, turning off, by the controller of the power protection system, the cut-off switch to isolate the power source from the power converter.

Example 2

The method of example 1, wherein the detecting further comprises: asserting, by the controller of the power protection system, a first error signal in response to detecting the fault condition, wherein the first error signal indicates an electrical short of the first current path of the power converter.

Example 3

The method of example 1, wherein the indicating further comprises: sensing, by a current sensing circuit of the power protection system, the first current flowing through the cut-off switch; and measuring, by a current measurement circuit, the sensed first current flowing through the cut-off switch.

Example 4

The method of example 3, wherein the indicating further comprises: determining, by the controller of the power protection system, that a measurement provided by the current measurement circuit is higher than a pre-determined threshold while the first gate control signal indicates an OFF state for the first current path of the power converter.

Example 5

The method of example 1, wherein the cut-off switch is a transistor, and the power protection system comprises a driver circuit coupled between a gate of the transistor and the controller of the power protection system, wherein providing the driving signal comprises: sending, by the controller of the power protection system, a gate control voltage to the driver circuit such that an output of the driver circuit is configured to turn on the cut-off switch.

Example 6

The method of example 1, wherein the power converter is a switched mode power supply, the first current path of the power converter is a high-side switch, the power converter further comprises a low-side switch, and wherein, while the power converter is in operation, the high-side switch and the low-side switch are switched on and off alternately.

Example 7

The method of example 1, wherein the power converter is a linear regulator, and the first current path of the power converter is a pass transistor of the linear regulator.

Example 8

The method of example 1, further comprising, before detecting the fault condition of the power converter, performing a self-test of the power protection system while the power converter is not in operation, wherein performing the self-test of the power protection system comprises: turning off, by the controller of the power protection system, the cut-off switch; turning on, by the controller of the power protection system, a current source coupled to a first node between the cut-off switch and the power converter; comparing, by a comparator of the power protection system, a voltage at the first node with a second pre-determined threshold; and in response to detecting that the voltage at the first node is above the second pre-determined threshold, asserting, by the controller of the power protection system, an error signal indicating an electrical short of the cut-off switch.

Example 9

The method of example 1, further comprising, before detecting the fault condition of the power converter, performing a self-test of the power converter while the power converter is not in operation, wherein performing the self-test of the power converter comprises: turning on, by the controller of the power protection system, the cut-off switch; detecting, by the controller of the power protection system, that there is a current flowing through the cut-off switch; and in response to detecting that there is a current flowing through the cut-off switch, asserting, by the controller of the power protection system, an error signal indicating an electrical short of the first current path of the power converter.

Example 10

The method of example 1, further comprising, before detecting the fault condition of the power converter, performing a self-test of the power protection system while the power converter is not in operation, wherein performing the self-test of the power protection system comprises: turning on, by the controller of the power protection system, the cut-off switch; comparing, by a comparator of the power protection system, a voltage at a first node with a second pre-determined threshold, wherein the first node is between the cut-off switch and the power converter; and in response to detecting that an output of the comparator indicates that the voltage at the first node is below the second pre-determined threshold, asserting, by the controller of the power protection system, an error signal indicating that the comparator is malfunctioning.

Example 11

The method of example 1, further comprising, before detecting the fault condition of the power converter, performing a self-test of the power protection system while the power converter is not in operation, wherein performing the self-test of the power protection system comprises: turning on, by the controller of the power protection system, the cut-off switch; turning on, by the controller of the power protection system, a current source coupled to a first node between the cut-off switch and the power converter; measuring, by a current measurement circuit of the power protection system, the first current flowing through the cut-off switch; and in response to detecting that the first current measured by the current measurement circuit is smaller than a second pre-determined threshold, asserting, by the controller of the power protection system, an error signal indicating that the current measurement circuit is malfunctioning.

Example 12

In an embodiment, a method of operating a power system comprising a power converter and a protection circuit that is coupled between a voltage supply and the power converter comprises: turning on, by a controller of the protection circuit, a cut-off switch of the protection circuit, the cut-off switch coupled between the voltage supply and an input voltage node of the power converter; starting the power converter by switching on and off power switches of the power converter; and after starting the power converter, performing a first test to detect an electrical short of a high-side power switch of the power converter, wherein performing the first test comprises: receiving, by the controller of the protection circuit, a gate control signal of the high-side power switch; and determining, by the controller of the protection circuit, that an electrical current flows through the cut-off switch when the gate control signal has a value that corresponds to an OFF state of the high-side power switch.

Example 13

The method of example 12, wherein performing the first test further comprises: asserting, by the controller of the protection circuit, a first error signal indicating the electrical short of the high-side power switch.

Example 14

The method of example 12, further comprising: in response to detecting the electrical short of the high-side power switch, turning off, by the controller of the protection circuit, the cut-off switch of the protection circuit.

Example 15

The method of example 12, further comprising, after starting the power converter, performing a second test to detect an electrical short of the cut-off switch of the protection circuit, wherein performing the second test comprises: measuring, by a first current measurement circuit of the protection circuit, a first value of a first current flowing through the cut-off switch of the protection circuit; measuring, by a second current measurement circuit of the power converter, a second value of a second current flowing through the high-side power switch of the power converter; and in response to detecting that the first value of the first current flowing through the cut-off switch of the protection circuit is smaller than a first pre-determined threshold and the second value of the second current flowing through the high-side power switch of the power converter is larger than a second pre-determined threshold, determining, by the controller of the protection circuit, that the cut-off switch is electrically shorted.

Example 16

The method of example 15, further comprising: in response to determining that the cut-off switch is electrically shorted, stopping, by a controller of the power converter, switching the power switches of the power converter.

Example 17

The method of example 12, further comprising, after starting the power converter, performing a second test to detect an electrical short of the high-side power switch of the power converter, wherein performing the second test comprises: measuring, by a first current measurement circuit of the protection circuit, a first value of a first current flowing through the cut-off switch of the protection circuit; measuring, by a second current measurement circuit of the power converter, a second value of a second current flowing through the high-side power switch of the power converter; and in response to detecting that the first value of the first current flowing through the cut-off switch of the protection circuit is larger than a first pre-determined threshold and the second value of the second current flowing through the high-side power switch of the power converter is smaller than a second pre-determined threshold, determining, by the controller of the protection circuit, that the high-side power switch is electrically shorted.

Example 18

In an embodiment, a power protection circuit configured to be coupled between a voltage supply and a power converter comprises: a controller; a driver circuit configured to be coupled between the controller and a cut-off switch, wherein a first load path terminal of the cut-off switch is configured to be coupled to the voltage supply, and a second load path terminal of the cut-off switch is configured to be coupled to the power converter; a current sensing circuit configured to be coupled to the cut-off switch and to sense a current flowing through the cut-off switch; a current measurement circuit coupled between the controller and the current sensing circuit and configured to provide a first measurement of the sensed current flowing through the cut-off switch; a comparator configured to be coupled between the controller and the second load path terminal of the cut-off switch and to compare a voltage at the second load path terminal with a pre-determined voltage threshold; and a pull-down circuit configured to be coupled between the controller and the second load path terminal of the cut-off switch, wherein the controller is configured to: assert a drive signal to the cut-off switch; monitor the current through the cut-off switch based on the first measurement; detect that there is a current flowing through the cut-off switch when the power converter is activated and when a gate control signal of the power converter indicates an OFF state for a first current path of the power converter, the first current path being coupled to the second load path terminal of the cut-off switch; and upon detecting that there is a current flowing through the cut-off switch when the power converter is activated and when the gate control signal of the power converter indicates the OFF state for the first current path of the power converter, switch off the cut-off switch.

Example 19

The power protection circuit of example 18, further comprising the cut-off switch.

Example 20

The power protection circuit of example 18, wherein the controller is further configured to: accept a second measurement of a current through the first current path of the power converter; and detect an electrical short of the cut-off switch by determining that the first measurement indicates no current flowing through the cut-off switch and the second measurement indicates that there is current flowing through the first current path of the power converter.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating a power protection system coupled between a power source and a power converter, the method comprising:
producing, by a controller of the power protection system, a driving signal to a cut-off switch of the power protection system to electrically couple the power source to the power converter;
detecting, by the controller of the power protection system, a fault condition of the power converter while the power converter is in operation, wherein the detecting the fault condition comprises:
receiving, by the controller of the power protection system, a first gate control signal from the power converter, the first gate control signal indicating whether a first current path of the power converter is turned on or off while the power converter is in operation; and
indicating, by the controller of the power protection system, the fault condition when a first current flowing through the cut-off switch is above a first pre-determined threshold while the first gate control signal indicates an OFF state for the first current path of the power converter; and detecting, by the controller of the power protection system, an electrical short of the cut-off switch while the power converter is in operation, wherein the detecting the electrical short comprises:
receiving, by the controller of the power protection system, a second gate control signal from the power converter, the second gate control signal indicating whether the first current path of the power converter is turned on or off while the power converter is in operation; and
indicating, by the controller of the power protection system, the electrical short when a measurement of a second current flowing through the cut-off switch is below a second pre-determined threshold while the second gate control signal indicates an ON state for the first current path of the power converter.

2. The method of claim 1, wherein the detecting the fault condition further comprises:
asserting, by the controller of the power protection system, a first error signal in response to detecting the fault condition, wherein the first error signal indicates an electrical short of the first current path of the power converter.

3. The method of claim 1, wherein the indicating the fault condition further comprises:
sensing, by a current sensing circuit of the power protection system, the first current flowing through the cut-off switch; and
measuring, by a current measurement circuit, the sensed first current flowing through the cut-off switch.

4. The method of claim 3, wherein the indicating the fault condition further comprises:
determining, by the controller of the power protection system, that a measurement provided by the current measurement circuit is higher than the first pre-determined threshold while the first gate control signal indicates an OFF state for the first current path of the power converter.

5. The method of claim 1, wherein the cut-off switch is a transistor, and the power protection system comprises a driver circuit coupled between a gate of the transistor and the controller of the power protection system, wherein producing the driving signal comprises:
sending, by the controller of the power protection system, a gate control voltage to the driver circuit such that an output of the driver circuit is configured to turn on the cut-off switch.

6. The method of claim 1, wherein the power converter is a switched mode power supply, the first current path of the power converter is a high-side switch, the power converter further comprises a low-side switch, and wherein, while the power converter is in operation, the high-side switch and the low-side switch are switched on and off alternately.

7. The method of claim 1, wherein the power converter is a linear regulator, and the first current path of the power converter is a pass transistor of the linear regulator.

8. The method of claim 1, further comprising, before detecting the fault condition of the power converter, performing a self-test of the power protection system while the power converter is not in operation, wherein performing the self-test of the power protection system comprises:
turning off, by the controller of the power protection system, the cut-off switch;
turning on, by the controller of the power protection system, a current source coupled to a first node between the cut-off switch and the power converter;
comparing, by a comparator of the power protection system, a voltage at the first node with a third pre-determined threshold; and
in response to detecting that the voltage at the first node is above the third pre-determined threshold, asserting, by the controller of the power protection system, an error signal indicating an electrical short of the cut-off switch.

9. The method of claim 1, further comprising, before detecting the fault condition of the power converter, performing a self-test of the power converter while the power converter is not in operation, wherein performing the self-test of the power converter comprises:
turning on, by the controller of the power protection system, the cut-off switch;
detecting, by the controller of the power protection system, that there is a current flowing through the cut-off switch; and
in response to detecting that there is a current flowing through the cut-off switch, asserting, by the controller of the power protection system, an error signal indicating an electrical short of the first current path of the power converter.

10. The method of claim 1, further comprising, before detecting the fault condition of the power converter, performing a self-test of the power protection system while the power converter is not in operation, wherein performing the self-test of the power protection system comprises:
turning on, by the controller of the power protection system, the cut-off switch;
comparing, by a comparator of the power protection system, a voltage at a first node with a third pre-determined threshold, wherein the first node is between the cut-off switch and the power converter; and
in response to detecting that an output of the comparator indicates that the voltage at the first node is below the third pre-determined threshold, asserting, by the controller of the power protection system, an error signal indicating that the comparator is malfunctioning.

11. The method of claim 1, further comprising, before detecting the fault condition of the power converter, performing a self-test of the power protection system while the power converter is not in operation, wherein performing the self-test of the power protection system comprises:
turning on, by the controller of the power protection system, the cut-off switch;
turning on, by the controller of the power protection system, a current source coupled to a first node between the cut-off switch and the power converter;
measuring, by a current measurement circuit of the power protection system, the first current flowing through the cut-off switch; and
in response to detecting that the first current measured by the current measurement circuit is smaller than a third pre-determined threshold, asserting, by the controller of the power protection system, an error signal indicating that the current measurement circuit is malfunctioning.

12. A method of operating a power system comprising a power converter and a protection circuit, the protection circuit coupled between a voltage supply and the power converter, the method comprising:
turning on, by a controller of the protection circuit, a cut-off switch of the protection circuit, the cut-off switch coupled between the voltage supply and an input voltage node of the power converter;

starting the power converter by switching on and off power switches of the power converter;

after starting the power converter, performing a first test to detect an electrical short of a high-side power switch of the power converter, wherein performing the first test comprises:

receiving, by the controller of the protection circuit, a gate control signal of the high-side power switch; and determining, by the controller of the protection circuit, that an electrical current flows through the cut-off switch when the gate control signal has a value that corresponds to an OFF state of the high-side power switch; and after starting the power converter, performing a second test to detect an electrical short of the cut-off switch of the protection circuit, wherein performing the second test comprises:

measuring, by a first current measurement circuit of the protection circuit, a first value of a first current flowing through the cut-off switch of the protection circuit;

measuring, by a second current measurement circuit of the power converter, a second value of a second current flowing through the high-side power switch of the power converter; and in response to detecting that the first value of the first current flowing through the cut-off switch of the protection circuit is smaller than a first pre-determined threshold and the second value of the second current flowing through the high-side power switch of the power converter is larger than a second pre-determined threshold, determining, by the controller of the protection circuit, that the cut-off switch is electrically shorted.

13. The method of claim 12, wherein performing the first test further comprises:

asserting, by the controller of the protection circuit, a first error signal indicating the electrical short of the high-side power switch.

14. The method of claim 12, further comprising:

in response to detecting the electrical short of the high-side power switch, turning off, by the controller of the protection circuit, the cut-off switch of the protection circuit.

15. The method of claim 12, further comprising:

in response to determining that the cut-off switch is electrically shorted, stopping, by a controller of the power converter, switching the power switches of the power converter.

16. The method of claim 12, further comprising, after starting the power converter, performing a third test to detect an electrical short of the high-side power switch of the power converter, wherein performing the third test comprises:

in response to detecting that the first value of the first current flowing through the cut-off switch of the protection circuit is larger than the first pre-determined threshold and the second value of the second current flowing through the high-side power switch of the power converter is smaller than the second pre-determined threshold, determining, by the controller of the protection circuit, that the high-side power switch is electrically shorted.

17. A power protection circuit configured to be coupled between a voltage supply and a power converter, the power protection circuit comprising:

a controller;

a driver circuit configured to be coupled between the controller and a cut-off switch, wherein a first load path terminal of the cut-off switch is configured to be coupled to the voltage supply, and a second load path terminal of the cut-off switch is configured to be coupled to the power converter;

a current sensing circuit configured to be coupled to the cut-off switch and to sense a current flowing through the cut-off switch;

a current measurement circuit coupled between the controller and the current sensing circuit and configured to provide a first measurement of the sensed current flowing through the cut-off switch;

a comparator configured to be coupled between the controller and the second load path terminal of the cut-off switch and to compare a voltage at the second load path terminal with a pre-determined voltage threshold; and a pull-down circuit configured to be coupled between the controller and the second load path terminal of the cut-off switch, wherein the controller is configured to:

assert a drive signal to the cut-off switch;

monitor the current through the cut-off switch based on the first measurement;

detect that there is a current flowing through the cut-off switch when the power converter is activated and when a gate control signal of the power converter indicates an OFF state for a first current path of the power converter, the first current path being coupled to the second load path terminal of the cut-off switch; and upon detecting that there is a current flowing through the cut-off switch when the power converter is activated and when the gate control signal of the power converter indicates the OFF state for the first current path of the power converter, switch off the cut-off switch.

18. The power protection circuit of claim 17, further comprising the cut-off switch.

19. The power protection circuit of claim 17, wherein the controller is further configured to:

accept a second measurement of a current through the first current path of the power converter; and detect an electrical short of the cut-off switch by determining that the first measurement indicates no current flowing through the cut-off switch and the second measurement indicates that there is current flowing through the first current path of the power converter.

20. The method of claim 3, wherein the current sensing circuit comprises a first current mirror circuit of the cut-off switch.

* * * * *